United States Patent

Matson

[15] 3,637,512
[45] Jan. 25, 1972

[54] HYDROCARBON SOLVENT COMPOSITION

[72] Inventor: Ted P. Matson, Ponca City, Okla.
[73] Assignee: Continental Oil Company, Ponca City, Okla.
[22] Filed: July 22, 1968
[21] Appl. No.: 746,321

[52] U.S. Cl. .................................. 252/555, 8/142, 252/138, 252/171, 252/353
[51] Int. Cl. ..........................................C11d 1/12, D06l 1/04
[58] Field of Search ..........................252/161, 138, 171, 353; 260/513; 8/142

[56] References Cited

UNITED STATES PATENTS

| | | | |
|---|---|---|---|
| 2,061,618 | 11/1936 | Downing | 260/513 X |
| 3,222,286 | 12/1965 | Barnes | 252/161 |
| 3,234,258 | 2/1966 | Morris | 252/161 X |
| 3,285,858 | 11/1966 | Hirsch et al. | 252/161 X |
| 3,346,629 | 10/1967 | Broussalian | 252/161 X |
| 3,376,336 | 4/1968 | Stein et al. | 252/161 X |
| 3,409,637 | 11/1968 | Eccles et al. | 252/138 X |

*Primary Examiner*—Leon D. Rosdol
*Assistant Examiner*—Arnold I. Rudy
*Attorney*—Joseph C. Kotarski, Henry H. Huth, Jerry B. Peterson, Glen M. Burdick and Carrol Palmer

[57] ABSTRACT

A hydrocarbon solvent composition having improved foaming characteristics is provided wherein the hydrocarbon solvent composition consists of a petroleum-derived light hydrocarbon fraction and a foaming agent having the general formula

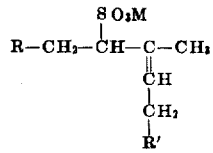

where R and R' are selected from H and acrylic hydrocarbon radicals, M is an alkaline earth or an alkali metal, and the total number of carbon atoms in said foaming agent is at least 18.

5 Claims, No Drawings

3,637,512

HYDROCARBON SOLVENT COMPOSITION

BACKGROUND OF THE INVENTION

1. Field of the Invention

This invention relates to hydrocarbon solvent compositions having improved foaming characteristics. In another aspect, this invention relates to a hydrocarbon solvent composition consisting essentially of a petroleum-derived light hydrocarbon fraction and an effective amount of a foaming agent, generally from about 0.05 to 5 weight percent, having the general formula

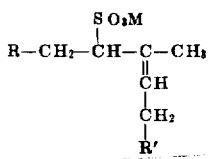

where R and R' are selected from H and acyclic hydrocarbon radicals, M is an alkaline earth or an alkali metal, and the total number of carbon atoms in said foaming agent is at least 18.

2. Description of the Prior Art

Liquid foams by definition are gas-liquid emulsions in which the liquid is the continuous phase. Liquid foams in which water is employed as the liquid are readily formed by either mechanically agitating or aerating the water which has dissolved therein a foaming agent. There are a relatively large number of different surface active compounds which serve as effective foaming agents for water due to the solubility characteristics of the water for such foaming agents. However, relatively few foaming agents are known which are capable of facilitating the formation of a stable foam from hydrocarbons having waterlike viscosity characteristics because of the insolubility characteristics of the hydrocarbons for the foaming agents. The few foaming agents for hydrocarbon compounds that are known and are effective for producing a stable foam for hydrocarbon compounds are certain polymeric sulfo derivatives of siloxane. However, such foaming agents are obtained only through a rather elaborate chemical process and, hence, are expensive.

Thus, it is desirable to produce a foaming agent for hydrocarbon compounds having waterlike viscosity characteristics which is readily obtainable and, hence, inexpensive. Thus, the need for an inexpensive foaming agent capable of providing a stable foam for hydrocarbon compounds is desirable for spot dry cleaning of textiles, rugs, and the like substrates. Further, a solvent composition having a foaming agent which produces a stable foam is useful in household applications, for example, in the use of foam polishing liquids. Still other commercial practices in which stable hydrocarbon foams are useful are the various cleaning and drilling operations encountered in the petroleum production industry.

OBJECTS OF THE INVENTION

An object of the invention is to provide a hydrocarbon solvent composition having improved foaming characteristics. Another object of the invention is to provide a foaming agent capable of facilitating the formation of a stable foam from hydrocarbons having waterlike viscosity characteristics. Another object of the invention is to provide an effective foaming agent for hydrocarbon compounds which is readily obtainable and relatively inexpensive. Other objects, advantages, and features of the invention will become readily apparent to those skilled in the art from a reading of the written description and the appended claims.

SUMMARY OF THE INVENTION

The present invention, in its broadest aspect, relates to a hydrocarbon solvent composition of improved foaming characteristics consisting essentially of a petroleum-derived light hydrocarbon fraction and an effective amount of a foaming agent, generally from about 0.05 to 5 weight percent, having the general formula

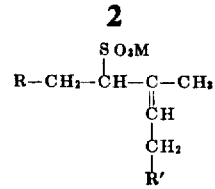

where R and R' are selected from H and acyclic hydrocarbon radicals, M is selected from the group consisting of alkaline earth metals and alkali metals, and the total number of carbon atoms in the foaming agent is at least 18. Preferably, the alkali metal constituent is sodium or potassium, and the alkaline earth metal is calcium. The foaming agent can be characterized as an alkali or alkaline earth metal salt derivative of a reaction product produced by sulfonation of an unsymmetrical dialkylethylene having at least 18 carbon atoms. Further details as to the nature of these foaming agents and the applicable hydrocarbon solvents are given in the general description of the invention to follow.

DESCRIPTION OF PREFERRED EMBODIMENTS

The foaming agent constituent of the hydrocarbon solvent composition of the present invention is represented by the general formula

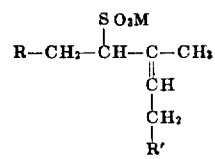

where R and R' are selected from hydrogen and acyclic hydrocarbon radicals, M is selected from the group consisting of alkali metals and the alkaline earth metals, and the total number of carbon atoms in said foaming agent is at least 18. Such formula is representative of an alkali or alkaline earth metal salt derivative of a reaction product produced by sulfonation of an unsymmetrical dialkylethylene having at least 18 carbon atoms.

The unsymmetrical dialkylethylene molecule having at least 18 carbon atoms can be obtained by either dimerization or condensation, two processes which are well known in the art for forming the desired compound. For example, an unsymmetrical dialkylethylene having at least 18 carbon atoms and mixtures thereof can be obtained by dimerizing linear monoolefins in accordance with the process of U.S. Pat. No. 2,695,327. Once the desired unsymmetrical dialkylethylene having at least 18 carbon atoms is prepared, the same is sulfonated by a suitable sulfonating agent.

Sulfonation of the unsymmetrical dialkylethylene is readily achieved by introducing diluted gaseous sulfur trioxide into the unsymmetrical dialkylethylene in accordance with the procedure disclosed in application Ser. No. 296,458 (filed July 23, 1963) entitled "Sulfonating Olefins with Gaseous Sulfur Trioxide," now issued as U.S. Pat. No. 3,409,637 and hereby incorporated in part. The temperature control during the sulfonation step is important and the temperature of the reaction mixture should not be permitted to rise above 50° C. Accordingly, it is preferred to maintain the reaction mixture at a temperature within the range of about 0° C. to 35° C. during sulfonation of the unsymmetrical dialkylethylene. Because of the necessity of maintaining the proper reaction temperature, it is necessary to introduce the vaporous sulfur trioxide into the unsymmetrical dialkylethylene in a diluted form. Suitable gaseous sulfonating mixtures normally contain from about 0.1 to 10 parts by volume sulfur trioxide and correspondingly from about 99.9 to 90 parts by volume of an inert gas, such as sulfur dioxide, nitrogen, air, hydrogen, argon and the like.

The amount of sulfur trioxide utilized to sulfonate the unsymmetrical dialkylethylene should not significantly exceed the stoichiometric requirement for the mono-sulfonation of the unsymmetrical dialkylethylene. The gaseous sulfonating stream consisting of the sulfur trioxide and the inert carrier gas is desirably introduced continuously and at a substantially uniform rate into the liquid charge of unsymmetrical dialkylethylene. By operating in this manner the sulfur trioxide content of the sulfonating stream is consumed in the reaction as quickly as it is introduced into the unsymmetrical dialkylethylene.

The reaction product produced by sulfonation of an unsymmetrical dialkylethylene having at least 18 carbon atoms is then saponified with an alkali metal or alkaline earth metal containing base so as to form the alkali or alkaline earth metal salt derivative of the sulfonation reaction product. The alkali or alkaline earth metal salt derivative of the sulfonation reaction product of the unsymmetrical dialkylethylene is then employed as the foaming agent for petroleum-derived light hydrocarbon fractions. The amount of foaming agent employed to produce a hydrocarbon solvent composition having improved foaming characteristics can vary broadly and generally varies from about 0.05 to 5 weight percent of foaming agent based on the amount of petroleum-derived light hydrocarbon fraction present in the hydrocarbon solvent composition. However, desirable results have been obtained wherein the hydrocarbon solvent composition contains from about 0.1 to 1 weight percent of the foaming agent. Examples of suitable foaming agents having the general formula

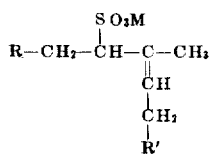

where R and R' are as previously described are as follows. However, these examples are for illustrative purposes only and represent typical compounds falling within the previously defined general formula for the foaming agent: calcium 9-methyl-8-heptadec-9-ene sulfonate; sodium 9-methyl-8-heptadec-9-ene sulfonate; potassium 9-methyl-8-heptadec-9-ene sulfonate; lithium 9-methyl-8-heptadec-9-ene sulfonate; sodium 9-methyl-8-nonadec-9ene sulfonate; calcium 9-methyl-8-nonadec-9-ene sulfonate; potassium 9-methyl-8-henicos-9-ene sulfonate; sodium 9-methyl-8-henicos-9-ene sulfonate, lithium 9-methyl-8-henicos-9-ene sulfonate, potassium 9-methyl-8-henicos-9-ene sulfonate, sodium 9-methyl-8-tricos-9-ene sulfonate, potassium 9-methyl-8-tricos-9-ene sulfonate, and calcium 9-methyl-8-tricos-9-ene sulfonate.

The petroleum-derived light hydrocarbon fraction constituent of the hydrocarbon solvent composition of the present invention can be any of the light oils which are derived from the refining of petroleum products. Such hydrocarbon constituents are kerosene Stoddard solvent, naphtha, and aromatic hydrocarbons, such as benzene, toluene, and the like. The only criteria which resides in the formation of the hydrocarbon solvent composition having improved foaming characteristics of the present invention is that the foaming agent must be soluble in the hydrocarbon constituent, the foaming agent must have at least 18 carbon atoms per molecule, and the hydrocarbon constituent of the solvent must be a petroleum-derived light hydrocarbon fraction.

Some examples of hydrocarbon solvent compositions having improved foaming characteristics are set forth hereinafter. However, it should be understood that such examples are for illustrative purposes only and, as such, should not be construed to limit the present invention. Such compositions comprise from 0.05 to 5 weight percent calcium 9-methyl-8-heptadec-9-ene sulfonate and kerosene; from 0.05 to 5 weight percent sodium 9-methyl-8-heptadec-9-ene sulfonate and naphtha; from 0.05 to 5 weight percent potassium 9-methyl-8-heptadec-9-ene sulfonate and benzene; from 0.05 to 5 weight percent calcium 9-methyl-8-nonadec-9-ene sulfonate and toluene; from 0.05 to 5 weight percent sodium 9-methyl-8-nonadec-9-ene sulfonate and kerosene; from 0.05 to 5 weight percent potassium 9-methyl-8-henicos-9-ene sulfonate and naphtha; from about 0.05 to 5 weight percent calcium 9-methyl-8-henicos-9-ene sulfonate and naphtha; from about 0.05 to 5 weight percent sodium 9-methyl-8-tricos-9-ene sulfonate and Stoddard solvent; and from about 0.05 to 5 weight percent potassium 9-methyl-8-tricos-9-ene sulfonate and kerosene.

In order to more fully illustrate the aspects and advantages of the invention, the following example is included. However, the example is for illustrative purposes and should not be construed as to unduly limit this invention.

EXAMPLE

A series of experiments were conducted wherein a hydrocarbon solvent composition was formed with kerosene and a variety of foaming agents in order to determine the foaming characteristics of the hydrocarbon solvent composition. In each experiment the sodium salt derivative of the various foaming agents was employed. The experiments were carried out by shaking the hydrocarbon solvent composition in a mixing cylinder and then allowing the hydrocarbon solvent different intervals to determine the foam stability characteristics of each composition. The following table is a summary of such experiments. All concentrations are in weight percent, unless otherwise stated.

TABLE

| Experiment No. | Foaming agent (sodium salt) | Conc. of foaming agent, percent | Foam in kerosene (ml.) in— | | | |
|---|---|---|---|---|---|---|
| | | | 1 min. | 5 min. | 15 min. | 30 min. |
| 1 | $C_{18}$-$C_{22}$ dimer olefin sulfonate. | 1.0 | 50 | | | |
| | | 0.1 | >40 | 40 | 20 | 20 |
| 2 | $C_{18}$ alkyl sulfonate | 1.0 | 10 | 4 | 4 | 2 |
| | | 0.1 | | 4 | 4 | 3 |
| 3 | $C_{18}$ olefin sulfonate | 1.0 | 10 | | | |

The dimer olefin sulfonate of experiment No. 1 was prepared from a $C_9$–$C_{11}$ olefin employing a conventional dimerization process such as hereinbefore described.

An experiment was conducted under the same conditions as above wherein the sodium salt derivative of a $C_{16}$ dimer olefin sulfonate was employed as the foaming agent. Hydrocarbon solvent compositions containing 0.1 and 1.0 weight percent of the sodium salt derivative of the $C_{16}$ dimer olefin sulfonate produced a foam but the foam disappeared within about 5 minutes. Thus, the sodium salt derivative of the $C_{16}$ dimer olefin sulfonate does not provide a stable foam.

Therefore, from the above experiments, it is readily apparent that the alkali metal salt derivative of the $C_{18}$–$C_{22}$ dimer sulfonate and a petroleum-derived, light hydrocarbon fraction produced a hydrocarbon solvent composition having exceptionally stable foaming characteristics.

Various modifications and alterations of this invention will become apparent to those skilled in the art without departing from the scope and spirit of this invention, and it should be understood that this invention is not to be limited unduly to that set forth herein for illustrative purposes.

I claim:

1. A hydrocarbon solvent composition of improved foaming characteristics consisting essentially of a petroleum-derived, light hydrocarbon fraction and from about 0.05 to 5 weight percent of a foaming agent having the general formula

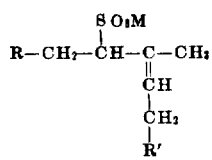

where R and R' are selected from H and acyclic hydrocarbon radicals, M is selected from the group consisting of alkaline earth metals and alkali metals, and the total number of carbon atoms in said foaming agent is in the range of 18 to 24.

2. The composition of claim 1 wherein said light hydrocarbon fraction is selected from the group consisting of kerosene, naphtha, Stoddard solvent, benzene and toluene, and said total number of carbon atoms in said foaming agent is in the range of 18 to 24.

3. The composition of claim 2 wherein said foaming agent is present in an amount from about 0.1 to 1 weight percent.

4. The composition of claim 3 wherein said M is an alkali metal component and is selected from the group consisting of sodium and potassium, 5. The composition of claim 3 wherein said M is calcium.

* * * * *

UNITED STATES PATENT OFFICE
CERTIFICATE OF CORRECTION

Patent No. 3,637,512      Dated January 25, 1972

Inventor(s) Ted P. Matson

It is certified that error appears in the above-identified patent and that said Letters Patent are hereby corrected as shown below:

Page 1, in the abstract, line 10, "acrylic" should be --acyclic--.

Column 2, line 37, "of alkali metals and the alkaline earth" should be --of alkali metals and alkaline earth--.

Column 4, line 34, after "solvent", insert --composition to stand. Foam readings were then taken at--.

Signed and sealed this 15th day of August 1972.

(SEAL)
Attest:

EDWARD M. FLETCHER, JR.
Attesting Officer

ROBERT GOTTSCHALK
Commissioner of Patents